July 21, 1964  F. JOCHIM  3,141,589
METHOD OF AND APPARATUS FOR CUTTING GLASS SHEETS
Filed May 31, 1960  2 Sheets-Sheet 1

INVENTOR.
FRIEDRICH JOCHIM
BY Bauer and Seymour
ATTORNEYS

July 21, 1964  F. JOCHIM  3,141,589
METHOD OF AND APPARATUS FOR CUTTING GLASS SHEETS
Filed May 31, 1960  2 Sheets-Sheet 2

INVENTOR.
FRIEDRICH JOCHIM
BY Bauer and Seymour
ATTORNEYS

United States Patent Office 3,141,589
Patented July 21, 1964

3,141,589
METHOD OF AND APPARATUS FOR CUTTING GLASS SHEETS
Friedrich Jochim, Herzogenrath, Germany, assignor to Compagnie de Saint-Gobain, Neuilly-sur-Seine, France
Filed May 31, 1960, Ser. No. 32,672
Claims priority, application France June 6, 1959
23 Claims. (Cl. 225—2)

This invention relates to the cutting of large sheets, particularly polished glass sheets, into useful sizes.

It is known that polished glass has internal and external defects and that the final stage of manufacture, called estimation, consists in detecting these defects and marking them on the glass to prepare for judicious elimination by cutting. As glass brings a higher price per sq. ft. the larger the piece, this estimation and cutting is extremely important.

The estimator gets the most out of each sheet by tracing cutting lines, usually corresponding to commercial sizes, which leave the largest sizes possible of perfect glass while discarding the pieces containing the defects and losing the minimum of good glass. By its nature this has largely been hand work.

It is an object of this invention to improve the marking of sheets and thereby to make automatic cutting by machine feasible and successful.

It is another object to present a method of cutting automatically in accordance with indicia marked on the sheet.

In practice, the large sheets of glass file slowly before the estimator, supported upright on rollers, as shown in FIG. 1, and the estimator inscribes the cutting plan on the sheet. The cutting plan is followed by the cutter who scores the glass with a cutting edge along the lines of the estimator and separates the sheet into smaller parts. This is handwork and it has imperfections which need not be elaborated.

It is another object of the invention to make the cutting by machine, more accurately and with less deviation than was previously possible, more quickly, with an improvement in output of saleable glass and a reduction in the size of the pieces containing defects.

The objects of the invention are accomplished, generally speaking by automatically actuating the cutting mechanisms by the cutting lines marked on the glass panel.

The process according to the invention when the cutting lines marked on the sheet are constituted by two series of lines, of which one series is normal to the other and the lines of each series are irregularly spaced, comprises moving the sheet past sheet cutting means and moving one series of lines past cutter activating means responsive thereto, thereby activating the cutting means, removing the segment thus separated from the sheet, passing the segment and the second series of lines in order past cutting means and cutter activating means responsive to the lines.

The objects of the invention are also accomplished by novel apparatus comprising means to support a sheet for marking, means to support the marked sheet for cutting including means to move the sheet at constant speed, cutter means operable across the course of the sheet having a component of motion in the direction of motion of the sheet equal to the speed of the sheet, means to activate the cutting means comprising electric means responsive to the markings on the sheet, and means to complete the severance along the line of the cut.

According to one mode of construction and operation, the estimator inscribes opaque lines on the sheet, indicating the segments into which the sheet is to to be cut, and other lines indicating the pieces into which the segments are to be cut, and sends the sheet to a first apparatus which has cutter activating means operated by a photoelectric cell over which the first series of lines of markings passes, and the segments are then sent to a second cutting mechanism activated by a second photocell over which the second series of lines of markings passes.

In another form of the invention the cutter is activated by marking the glass with electrically conductive lines which are engaged by contacts in the electric circuit which activates the cutter, in particular activating the scribe which scores the surface. Such lines may consist of metalized adhesive tape, a well-known commercial product.

In another form of the invention the lines are marked on the glass in permanently magnetized ferromagnetic material of which the magnetic field activates the cutter mechanism.

Yet another method of operating the cutter is to apply the lines in relief, for instance by adhesive tape of substantial thickness, which move a mechanical finger to activate the cutter. Thus, the lines can be made to act photoelectrically, electrically, or mechanically to activate a mechanically controlled cutter.

The scored sheet is taken to apparatus such as rollers which complete the severance from the sheet of the segments at the desired dimensions.

In ordinary practice the scorings will be made to produce rectangular pieces of commercial size but by suitable modification within the scope of the invention it can be made to produce pieces of any size and shape within the size of the sheet. For instance, the scribe may be moved, not along a straight edge to cut a straight line but along a curved edge to cut a curved line. No difference in principle is involved.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIG. 1 shows sheets of glass arranged vertically, supported by rollers, proceeding toward the cutting mechanism, bearing marks left by the estimator.

Figure 1:
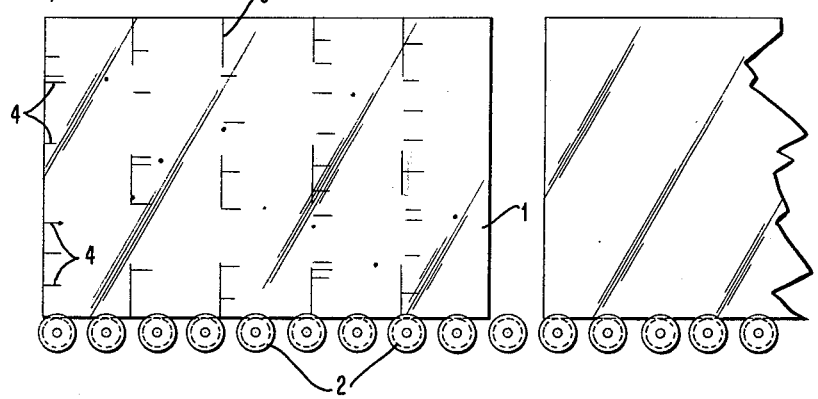

The glass sheet 1, supported by rollers 2, passes vertically before the estimator who puts on the sheet those lines which determine the final sizes of the pieces and eliminate the observed internal and external defects. The lines 3 determine the width of the segments into which the sheet is first cut and the lines 4 the length of the pieces into which the segments are to be cut. In the present form of realization the lines are opaque coloured lines or small adhesive bands. The lines extend to an edge of the sheet and segment, respectively, or are somewhere brought into alignment so that they can be made to pass, during the normal progress of sheet or segment, over a mechanism to be activated by them, such as between a photoelectric cell 8 and its source of illumination 9. The change in current in the cell produced by the opaque line activates the cutter mechanism and scores the surface of the glass.

The first cutting table is provided with horizontal rollers 5 which move the glass, now disposed horizontally on rollers 5, with slow and constant speed from left to right.

The rollers may be driven, and started as usual after closing of a switch 6 by the glass sheet. A cutter guide or bar 7 is mounted fixed relating to the table at an angle providing for the cutting tool a component of motion equal to the speed of the glass and in the same direction, thus causing the cutting tool to cut a straight line normal to the path of the glass. In other cases the guide can be normally arranged with respect to the path and driven at the same speed as the glass while the scribe cuts.

Figure 3:
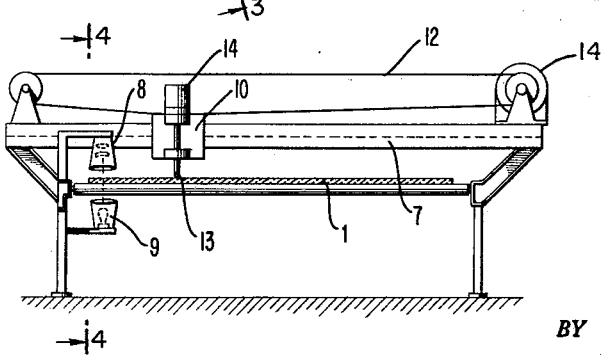
FIG. 3 is a section on line 3—3 of FIG. 2.
Figure 4:
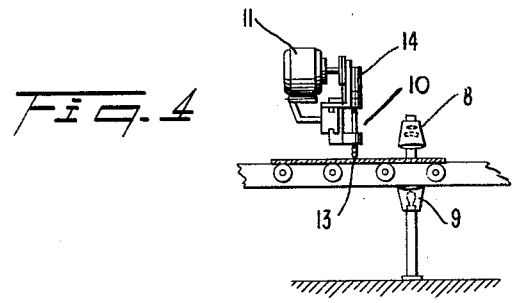
FIG. 4 is a section on line 4—4 of FIG. 3.

Near the edge of the sheet is provided a photoelectric cell 8 associated with a light source 9 (FIGS. 3 and 4). As soon as a line 3 intercepts the light beam striking the cell, the current of the cell is modified and the resulting impulse is communicated to an electric delay circuit starting the cutting tool 10 carried by guide 7. This cutting tool is driven at uniform speed by a motor 11 (FIG. 4) and chain 12 (FIG. 3). The cutting tool comprises a cutting wheel 13 which is magnetically forced against the glass by solenoids or magnets 14 energized as soon as the cut is to be made and is held out of contact with the glass in periods of idleness by the same magnet. At the end of the cut the motor 11 returns the scribe to the original position.

Figure 5:
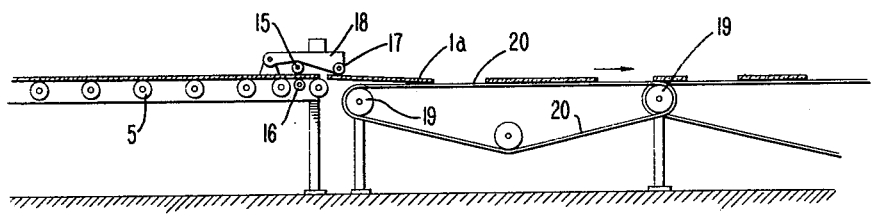
FIG. 5 is a longitudinal section through the breaker.

One score having been made, the glass, as shown in FIG. 5, is moved to the end of the table where rollers 15, 16, grip it between them, the space between rollers 15 and 16 corresponding to the thickness of the sheet. A weighted roller 17, carried on the end of pivoted arms 18, act to open the crack made by the score without putting a dangerous overstressing on the sheet itself, due to a difference of level between the cutting table and the following conveyor 20. The glass segment is caught by conveyor 20.

Figure 2:
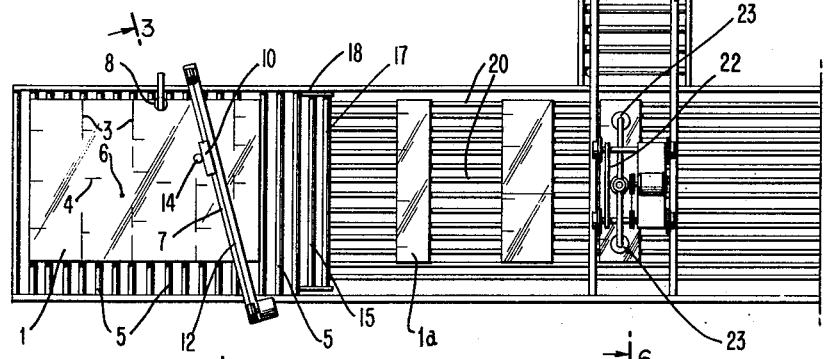
FIG. 2 is a plan view of a novel mechanism adapted to carry out the invention, mainly diagrammatic.
Figure 6:
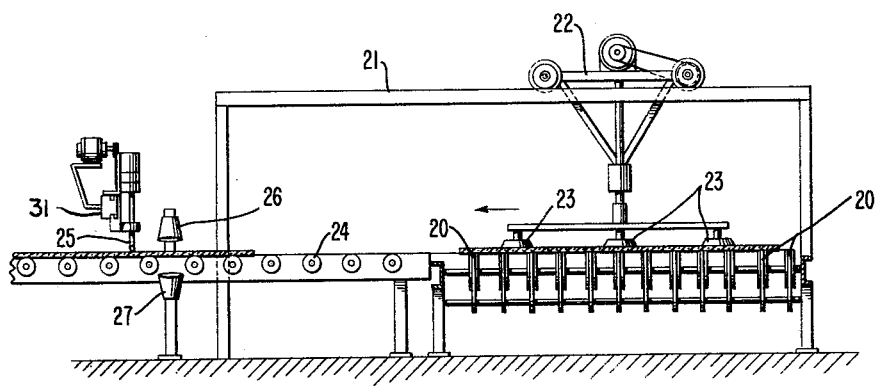
FIG. 6 is a diagrammatic section along line 6—6 of FIG. 2 in the direction of the arrows.

The conveyor 20 is of rubber belt type running over wheels 19 at a speed higher than that of the sheets, thus separating the segments from them. On the side of the conveyor 20 are placed mechanisms to cut the segments 1a into commercial sizes. One of these mechanisms is represented on FIG. 2. On FIG. 6 is shown a transferring device to transport the segments from the conveyor 20 to the final cutting table. A vacuum cup conveyor 22 picks up each segment, and deposits it on the rollers 24 of the second cutting table where it is to be cut into pieces. The vacuum cups 23 are a known type of conveyor and need be described only briefly. They are mounted on rails 21 and travel between conveyor 20 and table 24, picking the glass segment up and putting it down. The table transports it like table 5 and a cutter like 7–10 can be used.

A modification of cutting apparatus is illustrated in which the guide-support 31 for the tool 25 extends normally to the path of the glass, the photo-electric cell 26 activating a start-stop mechanism for the rollers of the table which move the glass until a line 4 interrupts the light between the light source 27 to the cell 26, the impulse from the cell stops the mechanism that drives the rollers and the cutter scores the glass. At the end of the score the cutter engages a switch that starts the rollers again, retracts the cutting tool, and returns the cutting tool to starting position. The same or a different breaker is used at the end of the second cutting table.

The apparatus transports sheets with indicia marked on them past detecting means which activate cutting mechanism. The indicia are usually lines spots or other marks, which may be opaque and activate a photoelectric cell, which activates the circuit of the motor that drives the cutting means, in which case the glass must be transparent around the marks, or the marks may be electrically conductive paint, foil, or metallized paper or plastic strips which are equally useful on opaque objects and cooperate with contacts to close an electrical circuit operating the cutter. The marks may also be ferromagnetic with permanent magnetism and pass into the range of a circuit responsive to their magnetic field and coupled to the cutting motor. Finally, the marks may be in relief and cooperate mechanically with a motor-starting switch coupled electrically to the cutting motor.

The preferred apparatus includes two cutting tables, one for separating the sheet into segments and the other for separating the segments into pieces, arranged at right angles and connected by means for transferring the segments to the second cutting table.

As many apparently widely different embodiments of the present invention may be made without departing from the spirit and scope thereof, it is to be understood that the invention is not limited to the specific embodiments.

What is claimed is:

1. Sheet cutting apparatus for dividing a glass sheet comprising means to support a sheet for marking with two series of marks indicating both dimensions of the pieces to be obtained, means to support the marked sheet for cutting including means to move the sheet at constant speed, cutter means operable across the sheet transversely to the direction of displacement of the sheet, means to activate said cutter means comprising means including a light source, a photo-electric cell and electric means so constructed and arranged as to be responsive only to the first series of marks corresponding to the dimensions of the pieces to be obtained counted along the direction of displacement of the sheet, means to complete the severence of the sheet into transverse segments along the successive lines of cut, other means to support the segments, means to move the segments at constant speed, cutter means operable across the segments, means to activate said last-named cutter means comprising means including a light source, a photo-electric cell and electric means so constructed and arranged as to be responsive only to the second series of marks corresponding to the dimensions of the pieces to be obtained counted transversely to the initial direction of displacement of the glass sheet, and other means to complete the severence along the last lines of cut.

2. Sheet cutting apparatus according to claim 1 in which the cutting tool has a component of motion in the direction of motion of the sheet equal to the speed of the sheet.

3. Sheet cutting apparatus according to claim 2, comprising means for displacing the cutting tool along a guide placed transversely to the sheet and inclined with regard to the direction of displacement of the sheet, and means comprising a motor and an endless belt mounted on pulleys fixed on the support of the cutting table for moving the cutting tool with a continuous motion.

4. Sheet cutting apparatus according to claim 1, comprising a conveyor to carry away the segments of the sheet cut on the first cutting table at a speed higher than the speed of displacement of the sheet to separate the segments one from the other.

5. Sheet cutting apparatus according to claim 4, comprising a movable device placed above the path of the segments, a beam transverse to the direction of displacement of the segments for supporting the movable device and vacuum cups on the movable device to transfer the segments from the first cutting table to a second cutting table.

6. Sheet cutting apparatus according to claim 5, comprising rollers on the second table for displacing the segments, a fixed support perpendicular to the direction of motion of the segments, a cutting tool movable on the fixed support, and means responsive to the marking on the segments for actuating the cutting tool and stopping the segments.

7. Sheet cutting apparatus according to claim 1, comprising means responsive to the markings on the sheet for controlling the displacement of the cutting tool to bring it into or out of contact with the glass sheet and for controlling the motion of the cutting tool along the cutting line.

8. Sheet cutting apparatus for dividing bodies such as glass comprising means to support a sheet for marking, means to support the marked sheet for cutting including means to move the sheet at constant speed, cutter means operable across the course of the sheet having a component of motion in the direction of motion of the sheet equal to the speed of the sheet, means to activate the cutting means comprising electric means responsive to the markings on the sheet, means to complete the severance along the line of the cut, transport means for the severed segments operable transversely to the path of the sheet, cutting means associated with the transport means operable normally to the path thereof, means to stop the transport means to cut the segment, and means to activate the transport means and the cutter comprising indicia responsive means activated by the markings on the segment.

9. Apparatus according to claim 1, wherein the cutter scores the glass, and the means to complete the severance of the sheet into transverse segments comprises roller means to receive and grip the glass between them, conveyor means to receive the piece of glass issuing from between the rollers having a level below that of the glass, and means to press the sheet issuing from the rollers toward the conveyor means to break the glass along the score.

10. A glass sheet estimating and cutting method comprising defect detecting of the sheet, marking the sheet whenever an objectionable defect condition is detected with indicia having first and second characteristics, detecting the indicia having said first characteristic to control first cutting means responsive thereto, and detecting the indicia having said second characteristic to control second cutting means responsive thereto, said first and second cutting means being adapted to cut the sheet in mutually orthogonal first and second directions, respectively, and said marking being adapted to provide the optimum division of the sheet and minimum loss of useful glass therefrom.

11. A method according to claim 10 wherein the sheet is marked with indicia having light-absorbing first and second characteristics, and the detecting of the indicia having the first characteristic is by first photo-electric means responsive thereto and the detecting of the indicia having the second characteristic is by second photo-electric means responsive thereto.

12. The method according to claim 10 wherein the sheet is marked with indicia having electrically conductive first and second characteristics, and the detecting of the indicia having the first characteristic is by first contact means adapted to be placed in engagement therewith, and the detecting of the indicia having the second characteristic is by second contact means adapted to be placed in engagement therewith.

13. The method according to claim 10 wherein the sheet is marked with indicia having magnetic first and second characteristics, and the detecting of the indicia having the first characteristic is by first magnetic sensor means responsive to said first magnetic characteristic and the detecting of the indicia having the second characteristic is by second magnetic sensor means responsive to said second characteristic.

14. A method according to claim 10 wherein the sheet is marked with indicia having first and second relief characteristics, and the detecting of the indicia having the first characteristic is by first relief detecting means adapted to be placed in engagement therewith, and the detecting of the indicia having the second characteristic is by second relief detecting means adapted to be placed in engagement therewith.

15. A method according to claim 10 further comprising transporting the sheet to said first cutting means and cutting therewith the sheet into segments in response to indicia having the first characteristic, transporting the segments in sequence to said second cutting means and cutting therewith into pieces those segments thereof marked with and in response to indicia having the second characteristic, and transporting the cut and uncut segments from said second cutting means, wherein the sheet in the absence of indicia having the first characteristic is uncut by said first cutting means and transported therefrom to said second cutting means to be cut thereby into pieces in response to indicia having the second characteristic, and the sheet in the further absence of indicia having the second characteristic and the segments in the absence of indicia having the second characteristic are uncut by said second cutting means and therefrom transported.

16. A glass sheet estimating and cutting method comprising defect detecting of the sheet, marking the sheet whenever an objectionable defect condition is detected with indicia comprising at least one line of first and second mutually orthogonal lines, detecting the indicia comprised of first lines to control first cutting means responsive thereto, and detecting the indicia comprised of second lines to control cutting means responsive thereto, said marking being adapted to provide the optimum division of the sheet and minimum loss of useful glass therefrom.

17. Sheet cutting apparatus for cutting a glass sheet comprising support means for supporting the sheet for the marking thereof with indicia having first and second characteristics in a predetermined manner whenever said sheet contains an objectionable defect condition, first and second detecting means responsive to indicia of said first and second characteristics, respectively, and first and second cutting means respectively coupled to said first and second detector means for cutting said sheet in first and second mutually orthogonal directions, respectively, whenever the respective detector thereof detects the characteristic respectively associated therewith, the marking and associated cutting therewith being adapted to provide the optimum division of the sheet and minimum loss of useful glass.

18. Sheet cutting apparatus according to claim 17 further comprising first transport means for transporting the sheet to said first detecting and cutting means, second transport means for transporting in sequence the segments formed when the sheets are cut by said first cutting means and for transporting the sheets uncut by said first cutting means from said first cutting means to said second detecting and second cutting means, and third transport means for transporting from said second cutting means the pieces formed when the segments and sheets are cut by the second cutting means and for transporting the sheets and segments uncut by said second cutting means.

19. Sheet cutting apparatus according to claim 18 wherein said sheet is marked with indicia having light-absorbing first and second characteristics, said first detecting means comprises a first source of light and first photo-electric circuit control means responsive to the light of said first source and the indicia having said light-absorbing first characteristic to control said first cutting means, and said second detecting means comprising a second source of light and second photo-electric circuit control means responsive to the light of said second source and the indicia having said light-absorbing second characteristic to control said second cutting means.

20. Sheet cutting apparatus according to claim 18 wherein said sheet is marked with indicia having electrically conducting first and second said characteristics, said first detecting means comprising a first electric control circuit having first electric contact means associated therewith adapted to be placed in engagement with indicia having the electrically conducting first characteristic to control said first cutting means, and said second detecting means comprising a second electrical control circuit having second electric contact means associated therewith adapted to be placed in engagement with indicia having the electrically conducting second characteristic to control said second cutting means.

21. Sheet cutting apparatus according to claim 18 wherein said sheet is marked with indicia having magnetic first and second said characteristics, said first detecting means comprising a first magnetic sensor responsive to indicia having said magnetic first characteristic and adapted to control said first cutting means, and said second detecting means comprising a second magnetic sensor responsive to indicia having said magnetic second characteristic and adapted to control said second cutting means.

22. Sheet cutting apparatus according to claim 19 wherein said sheet is marked with indicia having relief first and second said characteristics, said first detecting means comprising a first relief detector disposed to be in engagement with indicia having said first relief characteristic and being further adapted to control said first cutting means, and said second detecting means comprising a second relief detector disposed to be in engagement with indicia having said second characteristic and being further adapted to control said second cutting means.

23. Sheet cutting apparatus for dividing a glass sheet comprising means to support a sheet for marking with two series of marks having electrical conducting properties and indicating both dimensions of the pieces to be obtained, means to support the marked sheet for cutting including means to move the sheet at constant speed, cutter means operable across the sheet transversely to the direction of displacement of the sheet, means to activate said cutter means and comprising a first electric control circuit having first contact means associated therewith adapted to be placed in engagement with only the first series of marks corresponding to the dimensions of the pieces to be obtained counted along the direction of displacement of the sheet, means to complete the severance of the sheet into transverse segments along the successive lines of cut, other means to support the segments, means to move the segments at constant speed, cutter means operable across the segments, means to activate said last-named cutter means and comprising a second electric control circuit having second contact means associated therewith adapted to be placed in engagement with only the second series of marks corresponding to the dimensions of the pieces to be obtained counted transversely to the initial direction of displacement of the glass sheet, and other means to complete the severance along the last lines cut.

References Cited in the file of this patent

UNITED STATES PATENTS

| | | |
|---|---|---|
| 695,553 | Heany | Mar. 18, 1902 |
| 1,377,320 | Crowley | May 10, 1921 |
| 1,814,890 | Biagosch | July 14, 1931 |
| 2,236,011 | Shock | Mar. 25, 1941 |
| 2,623,587 | Hervey | Dec. 30, 1952 |
| 2,655,777 | Hagen | Oct. 20, 1953 |
| 2,674,308 | Knobel | Apr. 6, 1954 |
| 2,859,813 | Klotz | Nov. 11, 1958 |
| 2,877,846 | Tobey | Mar. 17, 1959 |
| 2,890,750 | Depken | June 16, 1959 |
| 2,900,761 | Clever | Aug. 25, 1959 |
| 2,948,991 | Walters et al. | Aug. 16, 1960 |
| 2,966,086 | Sjostrom | Dec. 27, 1960 |
| 3,029,675 | Alexander et al. | Apr. 17, 1962 |
| 3,044,216 | Billinger | July 17, 1962 |
| 3,068,733 | Held | Dec. 18, 1962 |